US008409722B2

(12) United States Patent
Torigoe et al.

(10) Patent No.: US 8,409,722 B2
(45) Date of Patent: Apr. 2, 2013

(54) ALLOY MATERIAL HAVING HIGH-TEMPERATURE CORROSION RESISTANCE, THERMAL BARRIER COATING, TURBINE MEMBER, AND GAS TURBINE

(75) Inventors: Taiji Torigoe, Hyogo (JP); Hidetaka Oguma, Hyogo (JP); Ikuo Okada, Hyogo (JP); Tomoaki Yunomura, Hyogo (JP); Soji Kasumi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 325 days.

(21) Appl. No.: 12/741,503

(22) PCT Filed: Mar. 13, 2009

(86) PCT No.: PCT/JP2009/054894
§ 371 (c)(1), (2), (4) Date: May 5, 2010

(87) PCT Pub. No.: WO2009/119345
PCT Pub. Date: Oct. 1, 2009

(65) Prior Publication Data
US 2010/0247950 A1 Sep. 30, 2010

(30) Foreign Application Priority Data
Mar. 28, 2008 (JP) ................................ 2008-088591

(51) Int. Cl.
*B32B 15/04* (2006.01)
*B32B 15/20* (2006.01)
*B32B 18/00* (2006.01)
*C23C 4/08* (2006.01)
*C22C 19/05* (2006.01)
*C22C 19/07* (2006.01)
*F01D 5/28* (2006.01)
*F03B 3/00* (2006.01)

(52) U.S. Cl. ........ 428/621; 428/668; 428/678; 428/680; 420/435; 420/437; 420/442; 420/456; 420/580; 420/588; 416/241 R

(58) Field of Classification Search .................. 428/621, 428/627, 629, 632, 633, 678, 679, 680, 668; 420/435, 436, 437, 445, 441, 442, 456, 580, 420/588; 416/223 R, 241 R
See application file for complete search history.

(56) References Cited

U.S. PATENT DOCUMENTS

2004/0180233 A1 9/2004 Stamm

FOREIGN PATENT DOCUMENTS

EP 1361291 A2 11/2003
EP 1783236 A1 5/2007

(Continued)

OTHER PUBLICATIONS

International Search Report of PCT/JP2009/054894, mailing date of Jun. 2, 2009.

(Continued)

*Primary Examiner* — Michael La Villa
(74) *Attorney, Agent, or Firm* — Westerman, Hattori, Daniels & Adrian, LLP

(57) ABSTRACT

An alloy material having high-temperature corrosion resistance, which exhibits excellent oxidation resistance and ductility and can be applied to gas turbines used at ultra high temperatures, and a thermal barrier coating, a turbine member and a gas turbine each comprising the alloy material. An alloy material having high-temperature corrosion resistance, comprising, by weight, Co: 15 to 30%, Cr: 10 to 30%, Al: 4 to 15%, Y: 0.1 to 3%, and Re: 0.1 to 1%, with the balance being substantially Ni. Also, an alloy material having high-temperature corrosion resistance, comprising, by weight, Ni: 20 to 40%, Cr: 10 to 30%, Al: 4 to 15%, Y: 0.1 to 3%, and Re: 0.1 to 5%, with the balance being substantially Co.

5 Claims, 1 Drawing Sheet

FOREIGN PATENT DOCUMENTS

| | | | |
|---|---|---|---|
| EP | 1790743 | A1 | 5/2007 |
| EP | 1798299 | A1 | 6/2007 |
| JP | 6-322506 | A | 11/1994 |
| JP | 2003-183752 | A | 7/2003 |
| JP | 2003-183754 | A | 7/2003 |
| WO | 99/23279 | A1 | 5/1999 |
| WO | 00/75398 | A1 | 12/2000 |
| WO | 2007/037277 | A1 | 4/2007 |

OTHER PUBLICATIONS

Supplementary European Search Report dated Aug. 4, 2011, issued in corresponding European Patent Application No. 09724707.6.

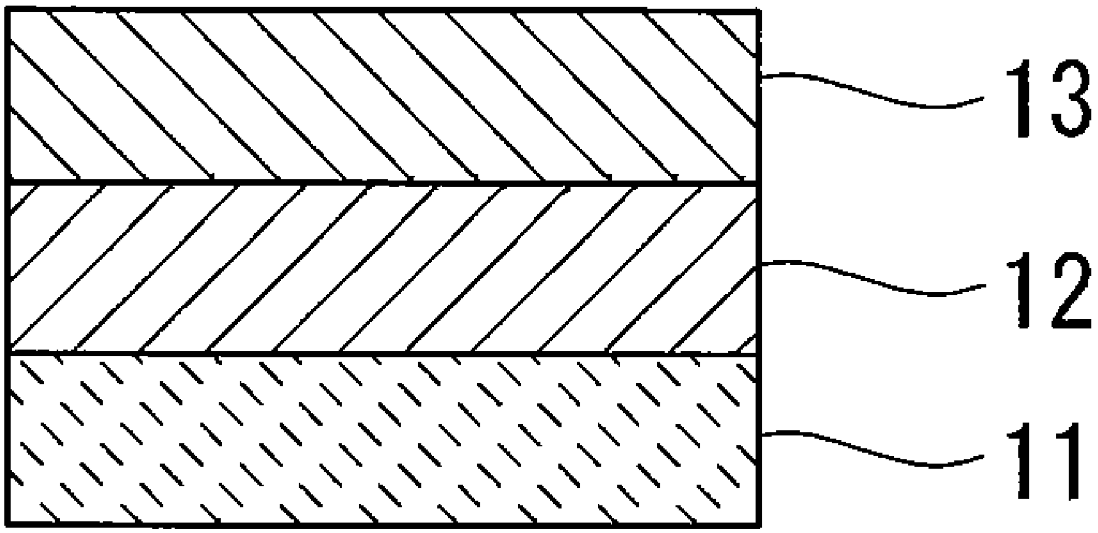
13
12
11

ALLOY MATERIAL HAVING HIGH-TEMPERATURE CORROSION RESISTANCE, THERMAL BARRIER COATING, TURBINE MEMBER, AND GAS TURBINE

TECHNICAL FIELD

The present invention relates to an alloy material having high-temperature corrosion resistance, and a thermal barrier coating, a turbine member and a gas turbine each comprising this alloy material. The invention relates particularly to an alloy material having high-temperature corrosion resistance that exhibits excellent oxidation resistance and ductility.

BACKGROUND ART

Nowadays, in the field of industrial gas turbines, a thermal barrier coating is capable of reducing the temperature of the heat-resistant alloy substrate of a turbine member such as a moving blade or stationary blade without altering the shape or cooling structure of the member, and therefore the use of such thermal barrier coating has become an essential technique.

The thermal barrier coating generally has a 2-layer structure in which a metal bonding layer formed from a MCrAlY alloy (wherein M represents Ni, Co, Fe, or an alloy thereof) with excellent oxidation resistance, and a ceramic layer with low thermal conductivity formed mainly from a zirconia-based ceramic are stacked sequentially on a heat-resistant alloy substrate.

One problem with these thermal barrier coating is that, for example, when a gas turbine is used for a long period of time at a high temperature exceeding 1500° C., a thermally grown oxide is generated on the metal bonding layer. As thermally grown oxide grows, it causes stress within the ceramic layer, which can cause cracking or peeling of the ceramic layer. Accordingly, the oxidation resistance of the metal bonding layer must be increased to suppress the growth rate of this thermally grown oxide.

Further, the temperature variations accompanying the starting and stopping of a turbine also cause thermal stress within the turbine member. As a result, cracks may occur in the metal bonding layer during operation of the turbine. Accordingly, the ductility of the metal bonding layer must also be improved.

CoNiCrAlY (Co-32Ni-21Cr-8Al-0.5Y) alloy is widely used as a material for the metal bonding layer, and although this alloy is capable of withstanding use within a 1500° C. class gas turbine, the oxidation resistance and ductility are inadequate for application to recently developed 1700° C. class ultra high temperature gas turbines. Consequently, significant effort is being devoted to developing alloys that are capable of withstanding ultra high temperatures. For example, PTL 1 and PTL 2 disclose alloy materials having high-temperature corrosion resistance that exhibit improved levels of oxidation resistance and ductility.

{Patent Literature}

{PTL 1} Japanese Unexamined Patent Application, Publication No. 2003-183752

{PTL 2} Japanese Unexamined Patent Application, Publication No. 2003-183754

SUMMARY OF INVENTION

The present invention provides an alloy material having high-temperature corrosion resistance, which exhibits excellent oxidation resistance and ductility, and can be applied to gas turbines used at ultra high temperatures. The invention also provides a thermal barrier coating, a turbine member and a gas turbine each comprising the alloy material.

One aspect of the alloy material having high-temperature corrosion resistance according to the present invention comprises, by weight, Co: 15 to 30%, Cr: 10 to 30%, Al: 4 to 15%, Y: 0.1 to 3%, and Re: 0.1 to 1%, with the balance being substantially Ni.

For the alloy material having high-temperature corrosion resistance and comprising Ni as the base metal according to the present invention, the action of each component and the reasons for restricting the amount of each component are described below.

Co: Co has the effect of improving the ductility of the alloy material having high-temperature corrosion resistance as the amount of added Co is increased. In the alloy material having high-temperature corrosion resistance according to the present invention, the Co content is specified as being not less than 15% by weight and not more than 30% by weight. At an amount less than 15% by weight, a satisfactory improvement in ductility may be unattainable. If an amount exceeding 30% by weight is included, then not only is there no change in the effect achieved, but the cost tends to increase.

Cr: Cr forms a protective coating at high temperature, and therefore increasing the amount of Cr has the effect of improving the oxidation resistance of the alloy material having high-temperature corrosion resistance. At an amount less than 10% by weight, satisfactory oxidation resistance may be unattainable, whereas if the amount exceeds 30% by weight, the alloy material tends to become overly hard, resulting in reduced ductility. In order to achieve a balance between the oxidation resistance and the ductility, the Cr content is specified as being not less than 10% by weight and not more than 30% by weight, and is preferably not less than 15% by weight and not more than 25% by weight.

Al: In those cases where the alloy material having high-temperature corrosion resistance is used for the metal bonding layer of a thermal barrier coating, Al forms a dense $Al_2O_3$ scale on the surface of the metal bonding layer, which has the effect of improving the oxidation resistance of the metal bonding layer, thereby improving the oxidation resistance of the thermal barrier coating. In the alloy material having high-temperature corrosion resistance according to the present invention, the Al content is specified as being not less than 4% by weight and not more than 15% by weight, and preferably not less than 6% by weight and not more than 12% by weight. At an amount less than 4% by weight, $(Ni,Co)(Cr,Al)_2O_4$ spinel composite oxides tend to be produced, and as a result, a dense $Al_2O_3$ scale is less likely to be produced, making the desired improvement in the oxidation resistance unobtainable. Further, because $(Ni,Co)(Cr,Al)_2O_4$ spinel composite oxides occupy a large volume, the production of these $(Ni,Co)(Cr,Al)_2O_4$ spinel composite oxides tends to cause stress within the ceramic layer, increasing the likelihood of cracking and peeling. If the Al content exceeds 15% by weight, then an intermetallic compound phase is formed with Ni (namely, Ni—Al), resulting in increased hardness and reduced ductility for the alloy material having high-temperature corrosion resistance.

Y: Y has the effect of preventing peeling of the $Al_2O_3$ scale generated on the metal bonding layer. In the alloy material having high-temperature corrosion resistance according to the present invention, the Y content is specified as being not less than 0.1% by weight and not more than 3% by weight, and preferably not less than 0.1% by weight and not more than 1% by weight. At an amount less than 0.1% by weight, an adequate effect may be unattainable. If the amount exceeds 3% by weight, then the metal bonding layer tends to become brittle, and the thermal shock resistance deteriorates.

Re: Re has the effect of enhancing the density of the $Al_2O_3$ scale formed on the surface of the metal bonding layer, thereby improving the oxidation resistance of the alloy material having high-temperature corrosion resistance. Further, Re also forms CrRe compounds in the oxidative degradation layer formed immediately beneath the $Al_2O_3$ scale, thereby preventing the oxidative degradation layer from becoming brittle, suppressing any deterioration in the thermal shock resistance, inhibiting the growth of $Al_2O_3$ scale, and preventing the occurrence of cracking and peeling. As a result, Re has the effect of extending the lifetime of the thermal barrier coating. In other words, upon formation of the $Al_2O_3$ scale, the oxidative degradation layer is formed as a result of a reduction in the Al concentration in the vicinity of the surface of the metal bonding layer and an associated relative increase in the concentrations of Cr and Ni and the like. This type of state where the concentrations of Cr and Ni have increased tends to promote the production of low-density, brittle compounds such as $NiCrO_4$ and $Cr_2O_3$ within the oxidative degradation layer. By incorporating Re, CrRe compounds are formed within the oxidative degradation layer, meaning the Cr concentration within the oxidative degradation layer is reduced, thereby preventing the generation of the low-density compounds mentioned above. In the alloy material having high-temperature corrosion resistance according to the present invention, the Re content is specified as being not less than 0.1% by weight and not more than 1% by weight, preferably not less than 0.2% by weight and not more than 1% by weight, and more preferably not less than 0.4% by weight and not more than 0.6% by weight. At an amount less than 0.1% by weight, almost no CrRe compounds are produced, whereas if the amount exceeds 1% by weight, then the alloy material having high-temperature corrosion resistance tends to become hard, resulting in reduced ductility.

The invention described above preferably also comprises, by weight, Ru: 0.1 to 1%.

Ru: Ru undergoes solid dissolution within the Ni base, and has the effect of reducing the diffusion rate of Al, thereby reducing the growth rates of the $Al_2O_3$ scale and the oxidative degradation layer, and improving the oxidation resistance of the alloy material having high-temperature corrosion resistance. In the case of Re, the oxidation resistance and thermal shock resistance of the alloy material having high-temperature corrosion resistance can be improved by adding a large amount of Re, but the resulting formation of CrRe compounds tends to increase the hardness of the alloy material having high-temperature corrosion resistance. In contrast, because Ru undergoes solid solution hardening, it is able to suppress any increases in hardness. Accordingly, by including Re and Ru, both the ductility and the oxidation resistance can be improved. In the alloy material having high-temperature corrosion resistance according to the present invention, the Ru content is specified as being not less than 0.1% by weight and not more than 1% by weight. At an amount less than 0.1% by weight, the effect of adding the Ru cannot be realized satisfactorily. If the amount exceeds 1% by weight, then the solid solution hardening tends to cause a reduction in the ductility of the alloy material having high-temperature corrosion resistance.

In this aspect of the present invention, the combined weight of the Re and the Ru preferably represents a weight ratio within a range from 0.2 to 1%.

By ensuring that the combined weight of Re and Ru is not less than 0.2% by weight and not more than 1% by weight, and preferably not less than 0.4% by weight and not more than 0.6% by weight, an alloy material having high-temperature corrosion resistance that also exhibits excellent ductility and superior oxidation resistance with a slow growth rate of $Al_2O_3$ scale can be obtained.

Furthermore, another aspect of the alloy material having high-temperature corrosion resistance according to the present invention comprises, by weight, Ni: 20 to 40%, Cr: 10 to 30%, Al: 4 to 15%, Y: 0.1 to 3%, and Re: 0.1 to 5%, with the balance being substantially Co.

For the alloy material having high-temperature corrosion resistance and comprising Co as the base metal according to the present invention, the action of each component and the reasons for restricting the amount of each component are described below. Descriptions which simply duplicate the above description of the Ni-based alloy material having high-temperature corrosion resistance are omitted.

Ni: Ni forms a protective coating at high temperature, and therefore increasing the amount of Ni has the effect of improving the ductility of the alloy material having high-temperature corrosion resistance. In the alloy material having high-temperature corrosion resistance according to this aspect of the present invention, the Ni content is specified as being not less than 20% by weight and not more than 40% by weight. At an amount less than 20% by weight, a satisfactory effect may be unobtainable, whereas even if the amount exceeds 40% by weight, no change is observed in the effect that is obtained.

Re: Re has the effect of enhancing the density of the $Al_2O_3$ scale formed on the surface of the metal bonding layer, thereby improving the oxidation resistance of the alloy material having high-temperature corrosion resistance. Further, Re also prevents the production of low-density, brittle compounds such as $CoCrO_4$ and $Cr_2O_3$ within the oxidative degradation layer immediately beneath the $Al_2O_3$ scale, and suppresses any deterioration in the thermal shock resistance. In the alloy material having high-temperature corrosion resistance according to this aspect of the present invention, the Re content is specified as being not less than 0.1% by weight and not more than 5% by weight. If the Re content exceeds 5% by weight, then the resulting CrRe layer causes an increase in the hardness of the alloy material having high-temperature corrosion resistance, resulting in reduced ductility.

The aspect of the invention described above preferably also comprises, by weight, Ru: 0.1 to 5%.

Ru: The Ru content is specified as being not less than 0.1% by weight and not more than 5% by weight. If the amount exceeds 5% by weight, then solid solution hardening tends to cause an increase in the hardness and a reduction in the ductility of the alloy material having high-temperature corrosion resistance.

In the aspect of the invention described above, the combined weight of the Re and the Ru preferably represents a weight ratio within a range from 1 to 5%.

In this Co-based alloy material having high-temperature corrosion resistance, by ensuring that the combined weight of Re and Ru is not less than 1% by weight and not more than 5% by weight, and preferably not less than 2% by weight and not more than 4% by weight, an alloy material having high-temperature corrosion resistance that also exhibits excellent ductility and improved oxidation resistance with a slow growth rate of $Al_2O_3$ scale can be obtained.

A thermal barrier coating of the present invention comprises a heat-resistant alloy substrate, a metal bonding layer formed on top of the substrate using the aforementioned Ni-based or Co-based alloy material having high-temperature corrosion resistance, and a ceramic layer laminated on top of the metal bonding layer.

Because the metal bonding layer formed using the aforementioned Ni-based or Co-based alloy material having high-temperature corrosion resistance exhibits excellent oxidation resistance and ductility, a metal bonding layer can be formed that is resistant to peeling and has a long lifetime. As a result, the thermal barrier coating according to the present invention exhibits excellent durability, being able to prevent the cracking and peeling of the ceramic layer caused by the growth of thermally grown oxide, and also prevent the cracking of the metal bonding layer that accompanies heat cycling such as that produced by the starting and stopping of a turbine.

In this case, the metal bonding layer is preferably formed by thermal spraying of a powder of the aforementioned Ni-based or Co-based alloy material having high-temperature corrosion resistance. By forming the metal bonding layer using a thermal spray method, a metal bonding layer can be formed with comparative ease even on large members of turbines and the like.

A turbine member according to the present invention comprises the thermal barrier coating described above. By using the above thermal barrier coating, a turbine member can be provided which is resistant to cracking and peeling of the ceramic layer and cracking of the metal bonding layer, and exhibits excellent durability at high temperatures and a long lifetime.

A gas turbine of the present invention comprises the turbine member described above. Because a gas turbine of the present invention is produced using a turbine member provided with an aforementioned thermal barrier coating having a metal bonding layer that exhibits excellent oxidation resistance and ductility, the gas turbine can be operated stably at a high temperature in the order of 1700° C. over an extended period of time.

One aspect of the alloy material having high-temperature corrosion resistance according to the present invention comprises, by weight, Co: 15 to 30%, Cr: 10 to 30%, Al: 4 to 15%, Y: 0.1 to 3%, and Re: 0.1 to 1%, with the balance being substantially Ni. Further, another aspect of the alloy material having high-temperature corrosion resistance according to the present invention comprises, by weight, Ni: 20 to 40%, Cr: 10 to 30%, Al: 4 to 15%, Y: 0.1 to 3%, and Re: 0.1 to 5%, with the balance being substantially Co. By forming the metal bonding layer of a thermal barrier coating using the above Ni-based or Co-based alloy material having high-temperature corrosion resistance, the oxidation resistance and ductility of the metal bonding layer can be improved. As a result, peeling of the ceramic layer and cracking of the metal bonding layer within the thermal barrier coating can be suppressed, meaning a thermal barrier coating can be provided that is applicable to ultra high temperature gas turbines.

BRIEF DESCRIPTION OF DRAWINGS

FIG. 1 A schematic illustration of a cross-section of a turbine member using the thermal barrier coating of the present invention.

REFERENCE SIGNS LIST

| | |
|---|---|
| 11 | Heat-resistant alloy substrate |
| 12 | Metal bonding layer |
| 13 | Ceramic layer |

{Description of Embodiments}

An embodiment of the present invention is described below.

FIG. 1 is a schematic illustration of a cross-section of a turbine member using a thermal barrier coating according to the present embodiment. A metal bonding layer 12 is formed on a heat-resistant alloy substrate 11 such as the moving blade of a turbine, and a ceramic layer 13 is formed on the metal bonding layer 12.

The metal bonding layer 12 in this embodiment is formed using an alloy material having high-temperature corrosion resistance that comprises, by weight, Co: 15 to 30%, Cr: 10 to 30%, Al: 4 to 15%, Y: 0.1 to 3%, and Re: 0.1 to 1%, with the balance being substantially Ni. This alloy material having high-temperature corrosion resistance and having the composition described above may further comprise, by weight, Ru: 0.1 to 1%. In such a case, the combined weight of Re and Ru preferably represents a weight ratio within a range from 0.2 to 1%.

Alternatively, the metal bonding layer 12 in this embodiment may be formed using an alloy material having high-temperature corrosion resistance that comprises, by weight, Ni: 20 to 40%, Cr: 10 to 30%, Al: 4 to 15%, Y: 0.1 to 3%, and Re: 0.1 to 5%, with the balance being substantially Co. This alloy material having high-temperature corrosion resistance and having the composition described above may further comprise, by weight, Ru: 0.1 to 5%. In such a case, the combined weight of Re and Ru preferably represents a weight ratio within a range from 1 to 5%.

The above Ni-based or Co-based alloy material having high-temperature corrosion resistance exhibits excellent oxidation resistance and ductility. Accordingly, the metal bonding layer 12 according to the present embodiment is unlikely to suffer from problems such as peeling of the ceramic layer or cracking of the metal bonding layer, meaning a thermal barrier coating having excellent thermal barrier properties and thermal shock resistance can be obtained.

The metal bonding layer 12 described above is deposited using a thermal spray method. Because the Ni-based or Co-based alloy material having high-temperature corrosion resistance described above includes active metal elements such as Al and Cr, the powder for thermal spraying is produced using a gas atomization method. A low-pressure plasma spraying method is ideal as the deposition method.

EXAMPLES

A more detailed description of the alloy material having high-temperature corrosion resistance according to the present embodiment is presented below using a series of examples.

Example 1

Each of the alloy powders having a composition detailed in Table 1 was deposited, using a low-pressure plasma spraying method, on the surface of an alloy metal substrate of thickness 5 mm (trade name: IN-738LC, chemical composition: Ni-16Cr-8.5Co-1.75Mo-2.6W-1.75Ta-0.9Nb-3.4Ti-3.4Al (mass %)), thereby preparing a sample having a metal bonding layer with a thickness of 100 μm. A comparative alloy was prepared using the CoNiCrAlY alloy that has conventionally been used for metal bonding layers.

The Vickers hardness of the metal bonding layer of each sample was measured using a load of 0.1 kg. After subjecting each sample to a heat treatment at 900° C. for 1,000 hours, a cross-section of the sample was inspected using a scanning electron microscope, and the thickness of the thermally grown oxide layer formed on the metal bonding layer was measured and recorded as the oxide amount. The results for the Vickers hardness and the oxide amount are recorded in Table 1.

TABLE 1

| | Chemical composition (wt %) | | | | | | | Hardness | Thermally grown oxide thickness |
|---|---|---|---|---|---|---|---|---|---|
| | Ni | Co | Cr | Al | Y | Re | Ru | (HV) | (μm) |
| Alloy A | Bal. | 20 | 20 | 10.5 | 0.5 | 0.5 | — | 405 | 3.2 |
| Alloy A-1 | Bal. | 10 | 20 | 10.5 | 0.5 | 0.5 | — | 450 | 2.8 |
| Alloy A-2 | Bal. | 15 | 20 | 10.5 | 0.5 | 0.5 | — | 415 | 2.8 |
| Alloy A-3 | Bal. | 30 | 20 | 10.5 | 0.5 | 0.5 | — | 402 | 2.8 |
| Alloy A-4 | Bal. | 31 | 20 | 10.5 | 0.5 | 0.5 | — | 400 | 3.1 |
| Alloy A-5 | Bal. | 20 | 9 | 10.5 | 0.5 | 0.5 | — | 370 | 6.5 |
| Alloy A-6 | Bal. | 20 | 10 | 10.5 | 0.5 | 0.5 | — | 400 | 3.8 |
| Alloy A-7 | Bal. | 20 | 30 | 10.5 | 0.5 | 0.5 | — | 418 | 2.6 |
| Alloy A-8 | Bal. | 20 | 35 | 10.5 | 0.5 | 0.5 | — | 500 | 2.4 |
| Alloy A-9 | Bal. | 20 | 20 | 16 | 0.5 | 0.5 | — | 550 | 2 |
| Alloy A-10 | Bal. | 20 | 20 | 15 | 0.5 | 0.5 | — | 419 | 2.6 |
| Alloy A-11 | Bal. | 20 | 20 | 4 | 0.5 | 0.5 | — | 390 | 3.9 |
| Alloy A-12 | Bal. | 20 | 20 | 3 | 0.5 | 0.5 | — | 380 | 6.5 |
| Alloy A-13 | Bal. | 20 | 20 | 10.5 | 5 | 0.5 | — | 500 | 3.2 |
| Alloy A-14 | Bal. | 20 | 20 | 10.5 | 3 | 0.5 | — | 419 | 3.3 |
| Alloy A-15 | Bal. | 20 | 20 | 10.5 | 0.1 | 0.5 | — | 410 | 4.1 |
| Alloy A-16 | Bal. | 20 | 20 | 10.5 | 0.05 | 0.5 | — | 402 | 5 |
| Alloy A-17 | Bal. | 20 | 20 | 10.5 | 0.5 | 5 | — | 500 | 2.8 |
| Alloy A-18 | Bal. | 20 | 20 | 10.5 | 0.5 | 1 | — | 410 | 3 |
| Alloy A-19 | Bal. | 20 | 20 | 10.5 | 0.5 | 0.1 | — | 403 | 3.4 |
| Alloy A-20 | Bal. | 20 | 20 | 10.5 | 0.5 | 0.05 | — | 400 | 5.5 |
| Alloy A-21 | Bal. | 20 | 20 | 10.5 | 0.5 | 0.3 | 5 | 450 | 2.9 |
| Alloy A-22 | Bal. | 20 | 20 | 10.5 | 0.5 | 0.3 | 1 | 410 | 3.4 |
| Alloy A-23 | Bal. | 20 | 20 | 10.5 | 0.5 | 0.3 | 0.2 | 395 | 3.1 |
| Alloy A-24 | Bal. | 20 | 20 | 10.5 | 0.5 | 0.3 | 0.1 | 405 | 3.9 |
| Alloy A-25 | Bal. | 20 | 20 | 10.5 | 0.5 | 0.05 | 0.05 | 401 | 5.6 |
| Alloy B | Bal. | 26 | 20 | 8 | 0.5 | 0.5 | — | 427 | 3.5 |
| Comparative alloy | 32 | Bal | 21 | 8 | 0.5 | — | — | 405 | 6 |

The results for the alloy A and alloys A-1 to A-4 represent the results of changing only the Co content. The alloy A and alloys A-1 to A-4 had a smaller oxide amount and therefore improved oxidation resistance compared with the comparative alloy. The alloy A-1 (Co content: 10 wt %) had a significantly greater hardness than the comparative alloy. For the alloys A-3 and A-4, the hardness values were substantially equal, a result that indicated that the degree of improvement in ductility provided by Co did not change once the Co content exceeded 30 wt %.

The results for the alloy A and alloys A-5 to A-8 represent the results of changing only the Cr content. A trend was observed wherein the oxidation resistance improved and the hardness increased as the Cr content was increased. The alloy A-5 (Cr content: 9 wt %) had a low hardness and excellent ductility, but the oxidation resistance was inferior to that of the comparative alloy. The alloy A-8 (Cr content: 35 wt %) exhibited excellent oxidation resistance, but was significantly harder than the comparative alloy. At Cr content values of not less than 10 wt % and not more than 30 wt %, the oxidation resistance was excellent and a hardness similar to that of the comparative alloy was obtained.

The results for the alloy A and alloys A-9 to A-12 represent the results of changing only the Al content. In a similar manner to that observed for Cr, the oxidation resistance improved but the hardness increased as the Al content was increased. At Al content values of not less than 4 wt % and not more than 15 wt %, the oxidation resistance was excellent and a hardness similar to that of the comparative alloy was obtained.

The results for the alloy A and alloys A-13 to A-16 represent the results of changing only the Y content. The oxidation resistance improved but the hardness increased as the Y content was increased. In particular, the hardness was dramatically greater than the comparative alloy for the alloy A-13 (Y content: 5 wt %). At Y content values of not less than 0.1 wt % and not more than 3 wt %, the oxidation resistance was excellent and a hardness similar to that of the comparative alloy was obtained.

The results for the alloy A and alloys A-17 to A-20 represent the results of changing only the Re content. The oxidation resistance improved but the hardness increased as the Re content was increased. At Re content values of not less than 0.1 wt % and not more than 1 wt %, the oxidation resistance was excellent and a hardness similar to that of the comparative alloy was obtained.

The results for the alloys A-21 to A-25 represent the results of also adding Ru. At Ru content values of not less than 0.1 wt % and not more than 1 wt %, the oxidation resistance was excellent and a hardness similar to that of the comparative alloy was obtained. In the alloys A-23 and A-24, the combined weight of Re and Ru was within a range from 0.2 to 1 wt %, and in both cases the balance between the hardness and the oxidation resistance was very favorable.

Further, although the Re content of the alloy A was the same as the combined weight of Re and Ru within the alloy A-23, the alloy A-23 exhibited a lower level of hardness. In other words, including Ru enabled any increase in hardness to be suppressed.

The alloy B, which represents an example having a composition that satisfies the ranges of the present invention, was able to form a metal bonding layer with excellent oxidation resistance and favorable hardness.

Example 2

Each of the alloy powders having a composition detailed in Table 2 was deposited, using a low-pressure plasma spraying method, on the surface of an alloy metal substrate of thickness 5 mm (trade name: IN-738LC, chemical composition: Ni-16Cr-8.5Co-1.75Mo-2.6W-1.75Ta-0.9Nb-3.4Ti-3.4Al (mass %)), thereby preparing a sample having a metal bonding layer with a thickness of 100 μm. A comparative alloy was prepared using the CoNiCrAlY alloy that has conventionally been used for metal bonding layers.

The Vickers hardness of the metal bonding layer and the oxide amount within each sample were measured in the same manner as Example 1. The results for the Vickers hardness and the oxide amount are recorded in Table 2.

TABLE 2

| | Chemical composition (wt %) | | | | | | | Hardness | Thermally grown oxide thickness |
|---|---|---|---|---|---|---|---|---|---|
| | Ni | Co | Cr | Al | Y | Re | Ru | (HV) | (μm) |
| Alloy C | 32 | Bal. | 20 | 8 | 0.5 | 3 | — | 401 | 3.7 |
| Alloy C-1 | 15 | Bal. | 20 | 8 | 0.5 | 3 | — | 460 | 3.9 |
| Alloy C-2 | 20 | Bal. | 20 | 8 | 0.5 | 3 | — | 418 | 3.8 |
| Alloy C-3 | 40 | Bal. | 20 | 8 | 0.5 | 3 | — | 390 | 3.8 |
| Alloy C-4 | 45 | Bal. | 20 | 8 | 0.5 | 3 | — | 385 | 3.9 |
| Alloy C-5 | 32 | Bal. | 9 | 8 | 0.5 | 3 | — | 375 | 6.6 |
| Alloy C-6 | 32 | Bal. | 10 | 8 | 0.5 | 3 | — | 390 | 4 |
| Alloy C-7 | 32 | Bal. | 30 | 8 | 0.5 | 3 | — | 415 | 3.8 |
| Alloy C-8 | 32 | Bal. | 35 | 8 | 0.5 | 3 | — | 485 | 3.2 |
| Alloy C-9 | 32 | Bal. | 20 | 3 | 0.5 | 3 | — | 370 | 6.3 |
| Alloy C-10 | 32 | Bal. | 20 | 4 | 0.5 | 3 | — | 380 | 3.8 |
| Alloy C-11 | 32 | Bal. | 20 | 15 | 0.5 | 3 | — | 416 | 3 |
| Alloy C-12 | 32 | Bal. | 20 | 16 | 0.5 | 3 | — | 560 | 2.5 |
| Alloy C-13 | 32 | Bal. | 20 | 8 | 0.05 | 3 | — | 402 | 5.8 |
| Alloy C-14 | 32 | Bal. | 20 | 8 | 0.1 | 3 | — | 405 | 3.9 |
| Alloy C-15 | 32 | Bal. | 20 | 8 | 3 | 3 | — | 418 | 3.2 |
| Alloy C-16 | 32 | Bal. | 20 | 8 | 5 | 3 | — | 454 | 3 |
| Alloy C-17 | 32 | Bal. | 20 | 8 | 0.5 | 0.05 | — | 390 | 5.8 |
| Alloy C-18 | 32 | Bal. | 20 | 8 | 0.5 | 0.1 | — | 400 | 3.9 |
| Alloy C-19 | 32 | Bal. | 20 | 8 | 0.5 | 5 | — | 415 | 3.5 |
| Alloy C-20 | 32 | Bal. | 20 | 8 | 0.5 | 6 | — | 550 | 3 |
| Alloy C-21 | 32 | Bal. | 20 | 8 | 0.5 | 3 | 0.05 | 401 | 5.7 |
| Alloy C-22 | 32 | Bal. | 20 | 8 | 0.5 | 3 | 0.1 | 405 | 3.9 |
| Alloy C-23 | 32 | Bal. | 20 | 8 | 0.5 | 3 | 3 | 415 | 3.4 |
| Alloy C-24 | 32 | Bal. | 20 | 8 | 0.5 | 3 | 5 | 418 | 2.8 |
| Alloy C-25 | 32 | Bal. | 20 | 8 | 0.5 | 3 | 8 | 450 | 2.6 |
| Alloy D | 32 | Bal. | 20 | 6 | 0.5 | 3 | — | 395 | 4 |
| Alloy D-1 | 32 | Bal. | 20 | 6 | 0.5 | 3 | 0.1 | 398 | 3.9 |
| Alloy D-2 | 32 | Bal. | 20 | 6 | 0.5 | 3 | 3 | 410 | 3.5 |
| Alloy D-3 | 32 | Bal. | 20 | 6 | 0.5 | 3 | 5 | 415 | 2.9 |
| Comparative alloy | 32 | Bal | 21 | 8 | 0.5 | — | — | 405 | 6 |

The results for the alloy C and alloys C-1 to C-4 represent the results of changing only the Ni content. The alloy C and alloys C-1 to C-4 had a smaller oxide amount and therefore improved oxidation resistance compared with the comparative alloy. The alloy C-1 (Ni content: 15 wt %) had a significantly greater hardness than the comparative alloy. For the alloys C-3 and C-4, the hardness values were substantially equal, indicating that once the Ni content exceeded 40 wt %, no further improvement in ductility was obtained.

The results for the alloy C and alloys C-5 to C-8 represent the results of changing only the Cr content. A trend was observed wherein the oxidation resistance improved and the hardness increased as the Cr content was increased. The alloy C-5 (Cr content: 9 wt %) had a low hardness and excellent ductility, but the oxidation resistance was inferior to that of the comparative alloy. The alloy C-8 (Cr content: 35 wt %) exhibited excellent oxidation resistance, but was significantly harder than the comparative alloy. At Cr content values of not less than 10 wt % and not more than 30 wt %, a metal bonding layer was obtained that exhibited excellent oxidation resistance and a hardness similar to that of the comparative alloy.

The results for the alloy C and alloys C-9 to C-12 represent the results of changing only the Al content. The oxidation resistance improved but the hardness increased as the Al content was increased. At Al content values of not less than 4 wt % and not more than 15 wt %, the oxidation resistance was excellent and a hardness similar to that of the comparative alloy was obtained.

The results for the alloy C and alloys C-13 to C-16 represent the results of changing only the Y content. The oxidation resistance improved but the hardness increased as the Y content was increased. At Y content values of not less than 0.1 wt % and not more than 3 wt %, the oxidation resistance was excellent and a hardness similar to that of the comparative alloy was obtained.

The results for the alloy C and alloys C-17 to C-20 represent the results of changing only the Re content. The oxidation resistance improved but the hardness increased as the Re content was increased. At Re content values of not less than 0.1 wt % and not more than 5 wt %, the oxidation resistance was excellent and a hardness similar to that of the comparative alloy was obtained.

The results for the alloys C-21 to C-25 represent the results of also adding Ru. A trend was observed wherein the oxidation resistance improved and the hardness increased as the Ru content was increased. At Ru content values of not less than 0.1 wt % and not more than 5 wt %, the oxidation resistance was excellent and a hardness similar to that of the comparative alloy was obtained. In the alloys C-21 and C-22, the combined weight of Re and Ru was within a range from 1 to 5 wt %, and in both cases the balance between the hardness and the oxidation resistance was very favorable.

The alloy D is an example having a composition that satisfies the ranges of the present invention. The alloy D was also able to form a metal bonding layer with excellent oxidation resistance and favorable hardness.

The alloys D-1 to D-3 represent the results of also adding Ru to the composition of the alloy D. In each case, the oxidation resistance was excellent and a hardness similar to that of the comparative alloy was obtained. In the alloy D-1, the combined weight of Re and Ru was within a range from 1 to 5 wt %, and the balance between the hardness and the oxidation resistance was very favorable.

The invention claimed is:

1. An alloy material having high-temperature corrosion resistance, comprising, by weight, Ni: 20 to 40%, Cr: 10 to 30%, Al: 4 to 15%, Y: 0.1 to 3%, Re: 0.1 to 5%, and Ru: 3 to 5 %, with a balance being substantially Co.

2. The alloy material having high-temperature corrosion resistance according to claim 1, wherein a combined weight of the Re and the Ru represents a weight ratio within a range from 1 to 5%.

3. A thermal barrier coating, comprising a heat-resistant alloy substrate, a metal bonding layer formed on top of the substrate using the alloy material having high-temperature corrosion resistance according to claim 1, and a ceramic layer laminated on top of the metal bonding layer.

4. A turbine member, comprising the thermal barrier coating according to claim 3.

5. A gas turbine, comprising the turbine member according to claim 4.

* * * * *